(12) United States Patent
Soukup et al.

(10) Patent No.: US 8,645,990 B2
(45) Date of Patent: Feb. 4, 2014

(54) DYNAMIC ADVERTISING CONTROL

(75) Inventors: Martin Jan Soukup, Ottawa (CA);
Dominic Goodwill, Kanata (CA);
Martin Meier, Ottawa (CA)

(73) Assignee: Ciena Corporation, Hanover, MD (US)

( * ) Notice: Subject to any disclaimer, the term of this patent is extended or adjusted under 35 U.S.C. 154(b) by 1235 days.

(21) Appl. No.: 11/615,628

(22) Filed: Dec. 22, 2006

(65) Prior Publication Data

US 2008/0155590 A1   Jun. 26, 2008

(51) Int. Cl.
*H04N 7/10* (2006.01)
*H04N 7/025* (2006.01)

(52) U.S. Cl.
USPC .......................................................... 725/34

(58) Field of Classification Search
USPC ............. 725/32, 34, 36, 42, 91, 9, 46, 50, 93, 725/109, 104, 110, 13, 28, 51, 60, 113, 725/135; 386/83, 248; 715/738
See application file for complete search history.

(56) References Cited

U.S. PATENT DOCUMENTS

| 5,532,735 | A | * | 7/1996 | Blahut et al. ..................... 725/32 |
| 5,600,364 | A | * | 2/1997 | Hendricks et al. ................. 725/9 |
| 5,600,573 | A | * | 2/1997 | Hendricks et al. ............. 725/109 |
| 6,006,257 | A | * | 12/1999 | Slezak ........................... 725/110 |
| 6,199,076 | B1 | * | 3/2001 | Logan et al. ................... 715/203 |
| 6,760,916 | B2 | * | 7/2004 | Holtz et al. ...................... 725/34 |
| 7,222,155 | B1 | * | 5/2007 | Gebhardt et al. ............. 709/204 |
| 7,519,273 | B2 | * | 4/2009 | Lowthert et al. .............. 386/248 |
| 2002/0199201 | A1 | * | 12/2002 | Kurauchi ....................... 725/104 |
| 2003/0023972 | A1 | * | 1/2003 | Gutta et al. ...................... 725/34 |
| 2003/0093792 | A1 | * | 5/2003 | Labeeb et al. .................. 725/46 |
| 2004/0158858 | A1 | | 8/2004 | Paxton et al. |
| 2004/0221311 | A1 | * | 11/2004 | Dow et al. ........................ 725/52 |
| 2005/0251820 | A1 | | 11/2005 | Stefanik et al. |
| 2006/0026302 | A1 | | 2/2006 | Bennett et al. |
| 2007/0033531 | A1 | * | 2/2007 | Marsh ............................. 715/738 |
| 2007/0050809 | A1 | * | 3/2007 | Pharn ............................... 725/32 |
| 2007/0154169 | A1 | * | 7/2007 | Cordray et al. ................. 386/83 |
| 2007/0283273 | A1 | * | 12/2007 | Woods .......................... 715/738 |
| 2008/0155616 | A1 | * | 6/2008 | Logan et al. ..................... 725/93 |
| 2009/0030978 | A1 | * | 1/2009 | Johnson et al. ............... 709/203 |

FOREIGN PATENT DOCUMENTS

EP  1220542 A1  7/2002

OTHER PUBLICATIONS

European Search Report for EP 07 02 4921, Aug. 7, 2008.

* cited by examiner

*Primary Examiner* — Nasser Goodarzi
*Assistant Examiner* — An Nguyen
(74) *Attorney, Agent, or Firm* — Muncy, Geissler, Olds & Lowe, PLLC

(57) ABSTRACT

Subscribers request programs from a network based content server and view the requested programs via their customer equipment. The content server receives various programs and breaks the program content for each program into a sequence of program segments, which are logically linked by program association indicia. The content server also receives advertisements and stores the advertisements as advertising segments, which generally contain at least one complete advertisement, but the invention is not limited thereto. Upon receiving a program request from a subscriber, the content server will identify advertising segments to provide along with the program segments for the requested program, and where to place the advertising segments among the program segments. Next, the content server will generate composite association indicia identifying the sequence of program and advertising segments, and effect delivery of the program and advertising segments to the subscriber in the sequence defined by the composite association indicia.

25 Claims, 9 Drawing Sheets

DYNAMIC ADVERTISING CONTROL

FIELD OF THE INVENTION

The present invention relates to the delivery of content to a subscriber, and in particular to dynamic control of advertising delivery.

BACKGROUND OF THE INVENTION

With the evolution of Internet Protocol based television (IPTV) and like streaming media services, the concept of a network based personal media recorder (nPMR), such as a network personal video recorder, has developed. From a subscriber perspective, the nPMR emulates the functionality of a personal media or video recorder where the subscriber can effectively store programs of interest and listen to or view the programs at some later time at the convenience of the subscriber. Thus, the nPMR is capable of storing programs, which are accessible by a subscriber upon request.

A fundamental difference between the nPMR and a traditional PMR is the location of these devices. The nPMR resides in the core of the service provider's network, while the traditional PMR resides at the customer premises and generally takes the form of a set-top box or digital video recorder. As with traditional PMRs, nPMRs allow subscribers to dynamically control delivery of the content for a selected program. Trick play features, such as play, pause, stop, rewind, and fast forward, are supported to allow substantial control over the listening or viewing experience.

Since the program content for any given request is generally delivered only to a particular subscriber, there is an opportunity to customize content delivery for that subscriber. For example, advertising provided in the program content may be customized or targeted for delivery to a certain subscriber or group of subscribers. Unfortunately, limited network resources prevent customizing advertising at this level. Entire programs cannot be customized with targeted advertising for different subscribers or groups of subscribers that are small enough to benefit from the targeted advertising.

Current techniques used by broadcasters, satellite, and cable service providers deliver program content with cue-tones, which indicate a location where an advertisement is located or can be inserted. In-stream processors are able to identify the cue-tones and replace or insert advertising in the program content. However, the resources necessary to target advertising to individual subscribers or smaller groups of subscribers are cost prohibitive.

As such, there is a need for an effective and efficient technique to control the advertising provided in program content, which is delivered by nPMRs. There is a further need for a technique to select advertising to provide in the program content based on subscriber related information, and deliver the selected advertising to the subscriber in a cost effective manner.

SUMMARY OF THE INVENTION

For the present invention, a content server is capable of functioning as a network-based personal content recorder. Subscribers request programs from the content server and view the requested programs via their customer equipment. The content server receives various programs and breaks the program content for each program into a sequence of program segments, which are logically linked by program association indicia. The content server also receives advertisements and stores the advertisements as advertising segments, which generally contain at least one complete advertisement, but the invention is not limited thereto. Upon receiving a program request from a subscriber, the content server will identify advertising segments to provide along with the program segments for the requested program, and where to place the advertising segments among the program segments. Next, the content server will generate composite association indicia identifying the sequence of program and advertising segments, and effect delivery of the program and advertising segments to the subscriber in the sequence defined by the composite association indicia. In one embodiment, the content of the program and advertising segments is streamed in sequence to the subscriber.

With the present invention, the content server, alone or in cooperation with another control server, is able to dynamically select the advertising to insert into program content to be delivered to a subscriber in real time upon receiving a request for the program content. As such, different subscribers may receive different advertising for the same program content. The advertising selected for a given request may be based on the program content itself, a subscriber profile, subscriber preferences, prior requests, listening or viewing habits, date, time of day, subscriber location, customer equipment type, customer equipment provider, service provider, or the like. Since the program content and the advertising are stored in segments, there is no need to store different combinations of program and advertising segments for different requests for the same program. All that is needed is the creation of the composite association indicia, which identifies the program and advertising segments as well as the desired sequence of the identified program and advertising segments for a given request. Based on the composite association indicia, the content server simply accesses the appropriate segments according to the defined sequence and streams the corresponding content to the customer equipment. Thus, significant flexibility is afforded in creating different advertising plans for different subscribers or subscriber requests without wasting network or processing resources.

The amount and type of advertising provided in the program content may vary from one subscriber to another or from one group of subscribers to another. Certain subscribers may pay higher rates than others to reduce the number of advertisements provided with the program content, or even eliminate advertisements from the program content delivered to the subscriber. Further, the content server and the customer equipment may cooperate with one another to control how a subscriber handles advertisements provided in the program content. For example, the content server and customer equipment may limit the extent to which advertisements are skipped or the number of advertisements that can be otherwise bypassed. Those skilled in the art will recognize the flexibility afforded by the present invention in controlling the selection and delivery of advertising that is provided along with the program content requested by the subscriber.

The program content may represent any type of media content that is capable of being streamed to the customer equipment. For example, the program content may include audio or video content that may or may not already contain advertising. If the program content already contains advertising when received by the content server, the content server may simply break the program content into program segments, some of which may contain the original advertising. Other advertising may be added as described above when a subscriber requests receipt of the program content. Alternatively, the content server may be able to detect the presence of and remove the original advertising from the program content, such that the program segments created from the program content do not contain the original advertising. Thus, when the program content is delivered to the subscriber in response to a request, only those advertisements provided in the selected advertising segments are provided with the program content.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
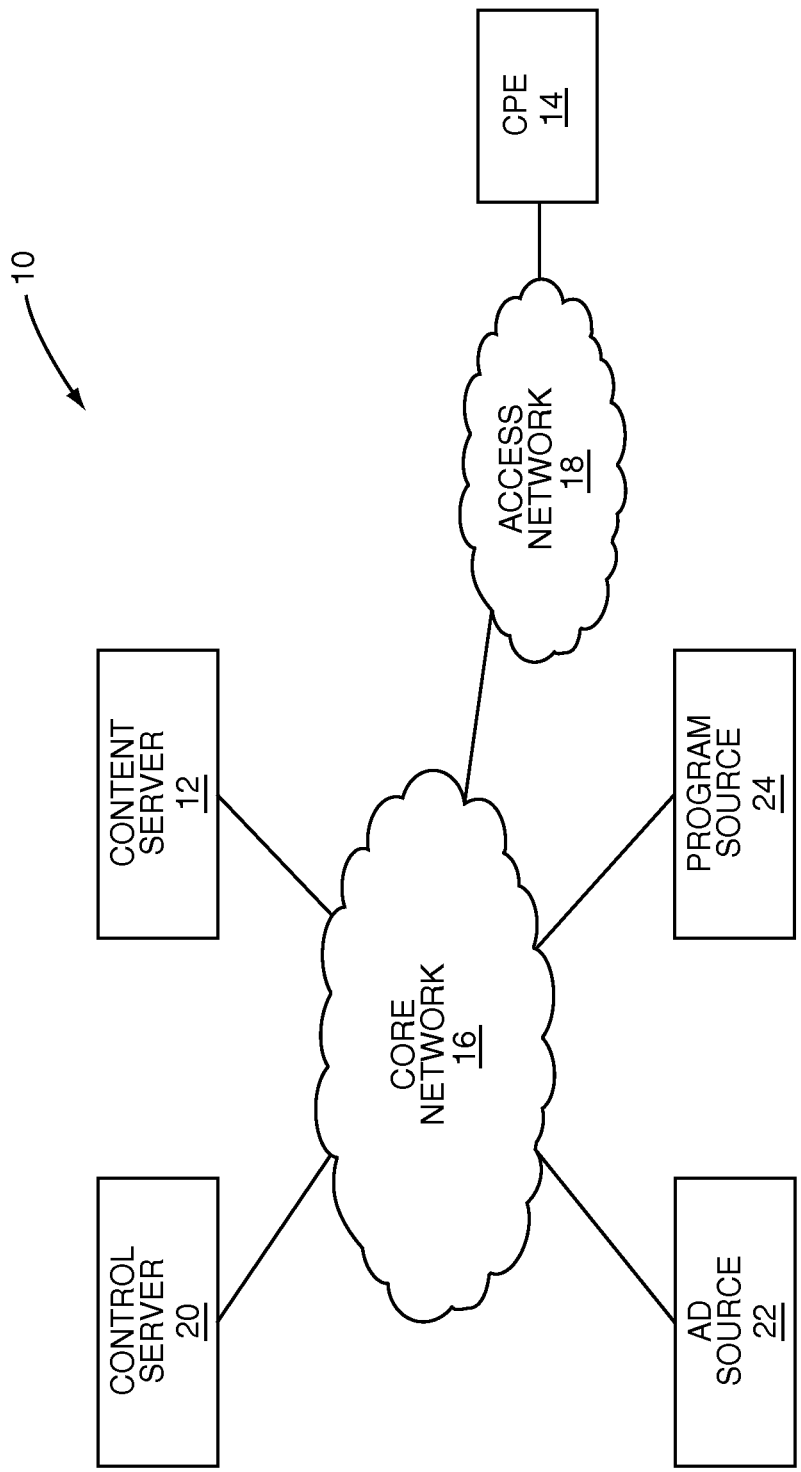
FIG. 1 is a block representation of a communication environment according to one embodiment of the present invention.

Prior to delving into the details of the present invention, an overview of a communication environment in which the present invention may be practiced is described. With reference to FIG. 1, a communication environment 10 is illustrated wherein a content server 12 is able to deliver content to various types of customer equipment, such as the illustrated customer premise equipment (CPE) 14. The content server 12 resides on a core network 16, which is coupled to the customer premise equipment 14 via an appropriate access network 18. The access network 18 may support wired or wireless communications with the customer premise equipment 14. Depending on the type of customer equipment to which content is being delivered, the customer equipment need not be located on the customer's premises. The use of the term "customer premise equipment" to describe equipment such as a set-top box, television with set-top box functionality, or the like, is solely for illustrative purposes. In addition to the content server 12, a control server 20, an advertisement (ad) source 22, and a program source 24 may also reside on the core network 16. In general, the control server 20 and the content server 12 will cooperate to control access to various program content by subscribers, as well as control the advertising that is provided within the program content to the subscribers. Further detail is provided below. The ad source 22 and the program source 24 provide the basic ad content and program content to the content server 12. The manner in which the ad content and the program content is stored on the content server 12 and delivered to subscribers is controlled by the various embodiments of the present invention.

In one embodiment of the present invention, the content server 12 is capable of functioning as a network-based personal content recorder. Subscribers request programs from the content server 12 and view the requested programs via their customer premise equipment 14. The content server 12 receives various programs from the program source 24 and breaks the program content for each program into a sequence of program segments, which are logically linked by program association indicia. The content server 12 also receives advertisements from the ad source 22 and stores the advertisements as advertising (ad) segments, which generally contain at least one complete advertisement, but the invention is not limited thereto. Upon receiving a program request from a subscriber, the content server 12 will identify ad segments to provide along with the program segments for the requested program, and where to place the ad segments among the program segments. Next, the content server 12 will generate composite association indicia identifying the sequence of program and ad segments and effect delivery of the program and ad segments in the sequence defined by the composite association indicia to the subscriber. In one embodiment, the content of the program and advertising segments is streamed in sequence to the subscriber.

With the present invention, the content server 12, alone or in cooperation with the control server 20, is able to dynamically select the advertising to insert into program content to be delivered to a subscriber in real time upon receiving a request for the program content. As such, different subscribers may receive different advertising for the same program content. The advertising selected for a given request may be based on the program content itself, a subscriber profile, subscriber preferences, prior requests, listening or viewing habits, date, time of day, subscriber location, customer equipment type, customer equipment provider, service provider, or the like. Since the program content and the advertising are stored in segments, there is no need to store different combinations of program and ad segments for different requests for the same program. All that is needed is the creation of the composite association indicia, which identifies the program and ad segments as well as the desired sequence of the identified program and ad segments for a given request. Based on the composite association indicia, the content server simply accesses the appropriate segments according to the defined sequence and streams the corresponding content to the customer premise equipment 14. Thus, significant flexibility is afforded in creating different advertising plans for different subscribers or subscriber requests without wasting network resources.

The amount and type of advertising provided in the program content may vary from one subscriber to another or from one group of subscribers to another. Certain subscribers may pay higher rates than others to reduce the number of advertisements provided with the program content or even eliminate advertisements from the program content delivered to the subscriber. Further, the content server 12 and the customer equipment may cooperate with one another to control how a subscriber handles advertisements provided in the program content. For example, the content server 12 and customer premise equipment 14 may limit the extent to which advertisements are skipped or the number of advertisements that can be otherwise bypassed. Those skilled in the art will recognize the flexibility afforded by the present invention in controlling the selection and delivery of advertising that is provided along with the program content requested by a subscriber.

The program content may represent any type of media content that is capable of being streamed to the customer premise equipment 14. For example, the program content may include audio or video content that may or may not already contain advertising. If the program content already contains advertising when received by the content server 12, the content server 12 may simply break the program content into program segments, some of which may contain the original advertising. Other advertising may be added as described above when a subscriber requests receipt of the program content. Alternatively, the content server 12 may be able to detect the presence of and remove, or store separately the original advertising from the program content, such that the program segments created from the program content do not contain the original advertising. Thus, when the program content is delivered to the subscriber in response to a request, only those advertisements provided by the selected ad segments are provided with the program content.

Figure 2:
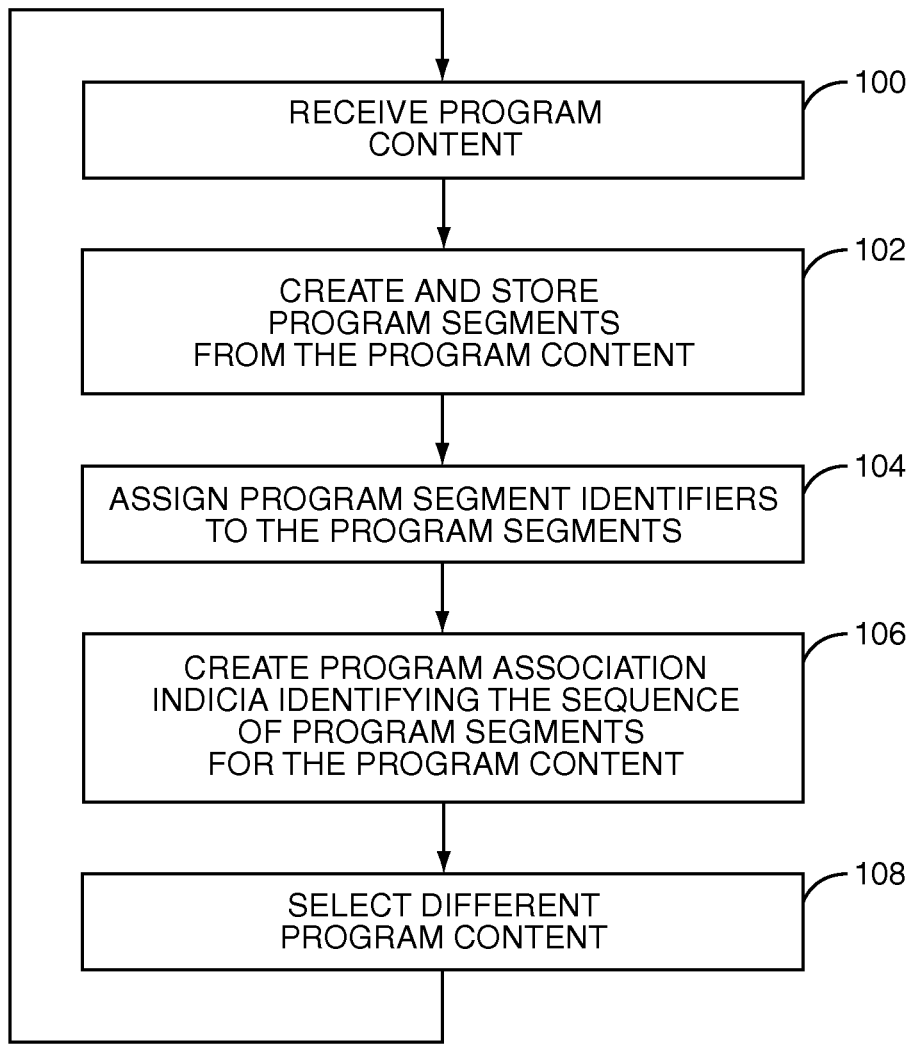
FIG. 2 is a flow diagram illustrating ingestion of program content according to one embodiment of the present invention.

With reference to FIG. 2 a flow diagram is provided to illustrate an exemplary process for receiving program content from the program source 24. Notably, program content may be received from any number of program sources 24 by the content server 12. Initially, the content server 12 will receive the program content from the program source 24 (step 100). The program content may be associated with a program content identifier (ID) or title. As the program content is received, the content server 12 will create and store program segments from the program content (step 102). The program segments represent portions or blocks of the overall program content. Each program segment is then assigned a program segment identifier (step 104). The content server 12 will create program association indicia, which identifies the sequence of program segments that represent the overall program content (step 106). As such, the program association indicia is a logical assembly of the program segments for the program content. The content server 12 will select different program content to receive (step 108), and repeat the above process for any such program content warranting being broken into segments according to the present invention.

Figure 3:
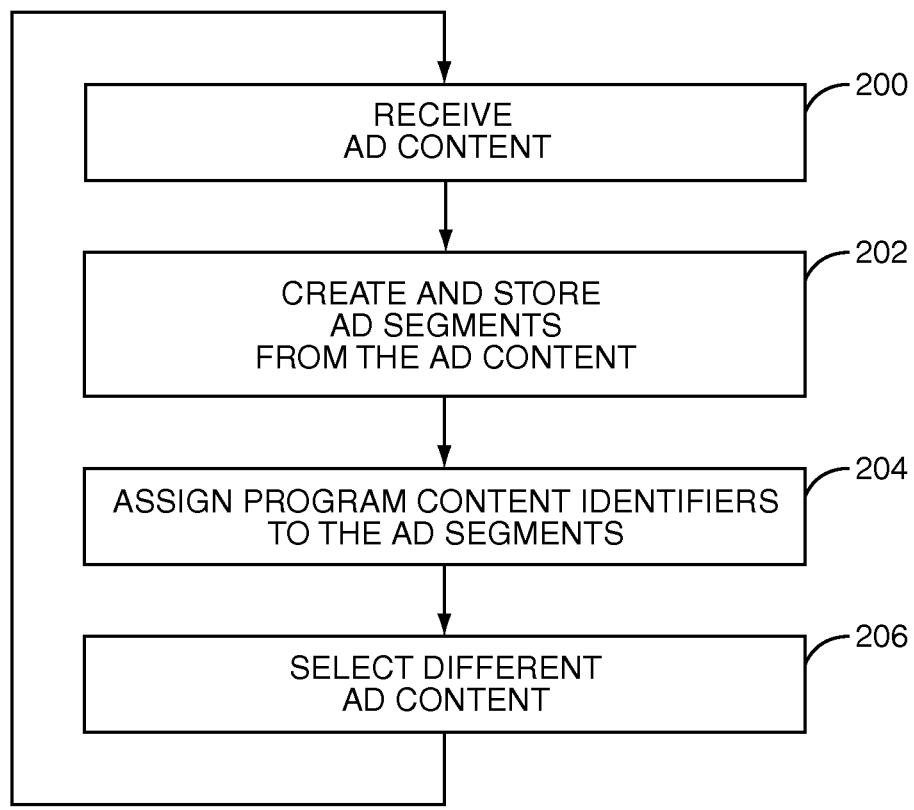
FIG. 3 is a flow diagram illustrating ingestion of ad content according to one embodiment of the present invention.

With reference to FIG. 3, advertising content is also received by the content server 12 and stored as segments. In particular, the content server 12 will receive ad content from various ad sources 22, potentially including the program source as described above (step 200). The ad content is stored as ad segments based on the ad content (step 202). As noted above, the advertising content may correspond to a single advertisement or multiple advertisements. The single advertisement or group of advertisements may be stored as a single ad segment, or each ad segment may correspond to a single advertisement or portion of an advertisement. Those skilled in the art will recognize various ways in which advertising may be built based on various segments of a given ad. However, for the purposes of discussion, assume that each ad segment corresponds to a single advertisement or multiple advertisements intended to run in succession upon being inserted into program content. The ad segments are assigned program content identifiers, if such identifiers do not already exist (step 204), and the process repeats once different advertising content is selected (step 206).

Figure 4A:
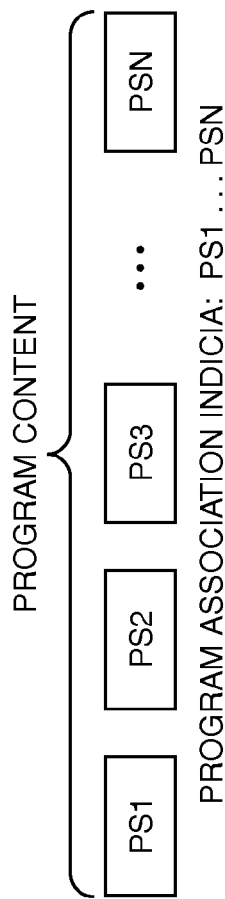
FIG. 4A illustrates program segments for certain program content according to one embodiment of the present invention.

With reference to FIG. 4A, the content server 12 will have stored various groups of program segments corresponding to the program content for various programs. For each program, the program content is stored as a sequence of program segments (PS1-PSN), which are logically associated in sequence by the program association indicia, which may include the program segment identifiers and the sequence in which the program segment identifiers must be presented to facilitate presentation of the program.

Figure 4B:
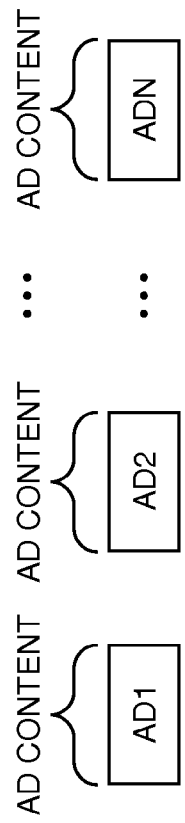
FIG. 4B illustrates various advertising segments corresponding to different advertising content according to one embodiment of the present invention.

Turning to FIG. 4B, each advertising segment (AD1-ADN) represents different ad content, which may include one or more advertisements and perhaps portions of a given advertisement. For example, a single advertisement may have a short version and an extended version, wherein multiple ad segments may be presented in sequence to represent the extended version, and a lesser number of ad segments may be presented for the shorter version.

Figure 4C:
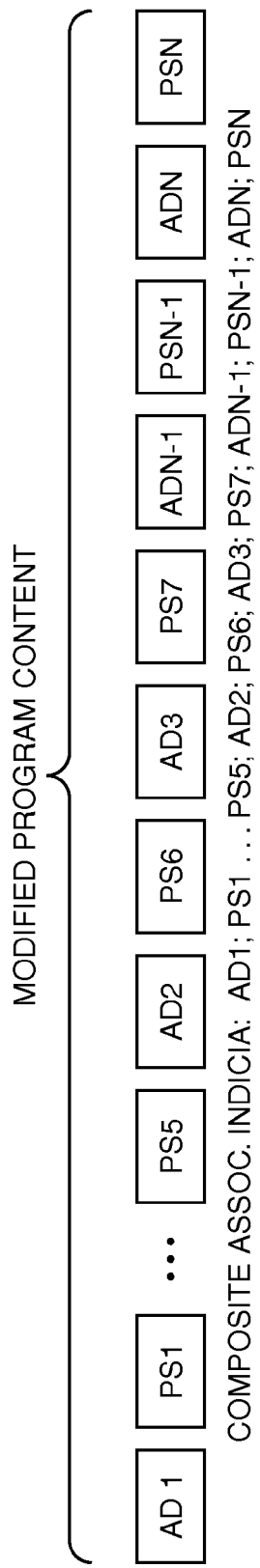
FIG. 4C illustrates a sequence of program segments and advertising segments, which represent modified program content with selected advertisements according to one embodiment of the present invention.
Figure 5:
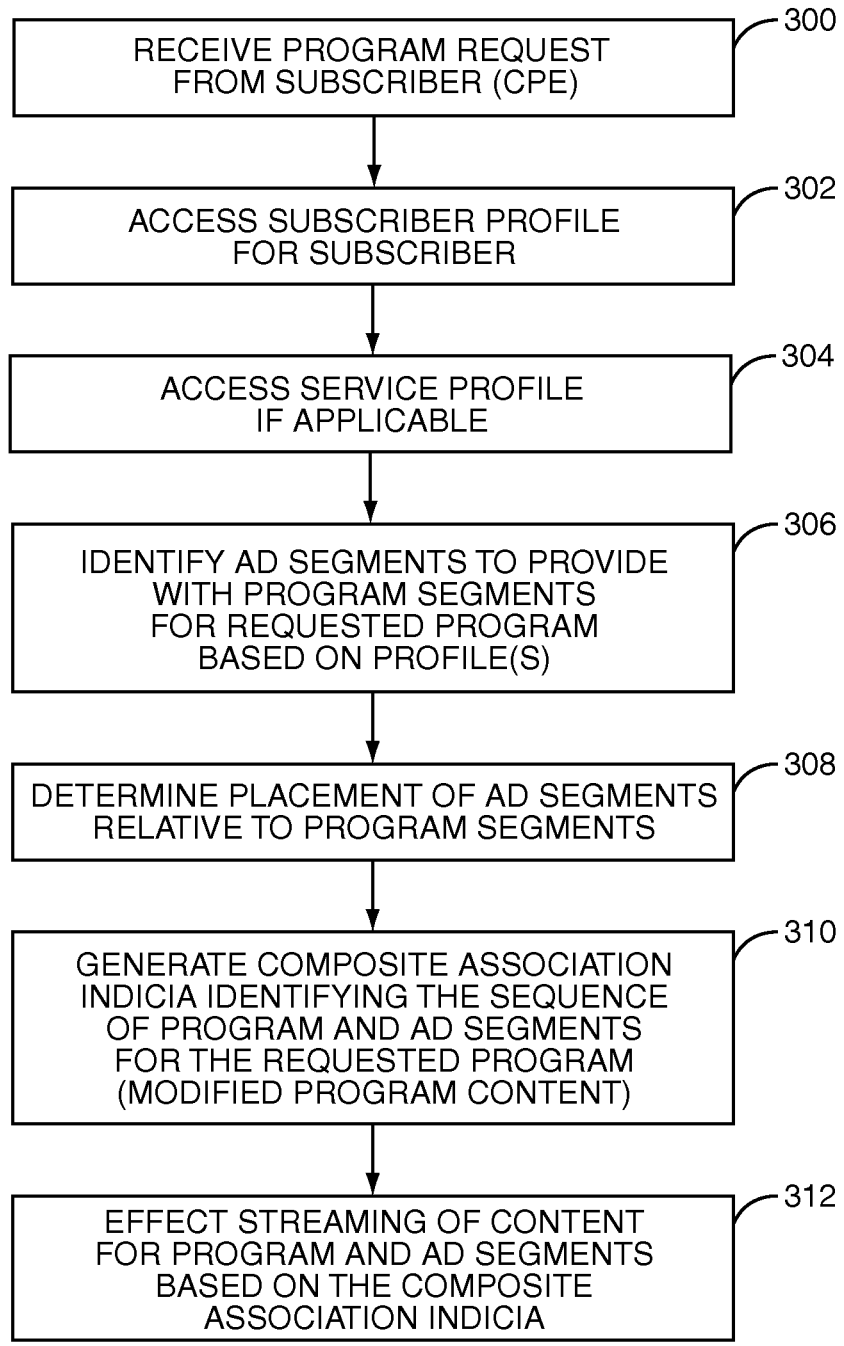
FIG. 5 is a flow diagram illustrating a process for handling requests from a subscriber according to one embodiment of the present invention.

Regardless of the particular configuration of the program segments and the ad segments, the program and ad segments represent the building blocks from which the content server 12 can dynamically create different advertising schemes to inject in the same or different program content for different subscribers based on any number of criteria. As such, the content server 12 can dynamically select any number or type of advertisements to insert into a given program by identifying ad segments and logically positioning the ad segments between certain program segments in the program content. The sequence of program segments and injected ad segments are then presented to the customer premise equipment 14 in sequence, as illustrated in FIG. 4C. An overview of this process is provided in FIG. 5.

Initially, assume the content server 12 receives a program request for a given program from a subscriber, preferably via the customer premise equipment 14 (step 300). The program request may include a program title or the program content identifier associated with the program content. Notably, the program content identifier or title may be or correspond to the program association indicia. Service providers will have significant leeway in informing the subscriber of available programs and linking requests for select programs to the program association indicia for the corresponding program. The content server 12 may then access a subscriber profile for the subscriber from an internal database or from the control server 20 (step 302), as well as access any other available service profiles that may come into play (step 304). Based on the available profiles, the content server 12 will obtain advertising selection criteria for the particular program request.

The advertising selection criteria may bear on the particular ad segments or type of ad segments to provide with the program content, the number of ad segments to provide with the program content, how many times a given ad segment is repeated during the program content, placement of the ad content throughout the program content, or the like. The advertising selection criteria need not identify every single advertisement and the placement thereof; the content server 12 may be given different degrees of flexibility to dynamically select types of ad content from a group of ad content to inject some level of randomness within defined constraints when selecting and placing ad content within the program content. Alternatively, the spaces may be pre-selected but the specific ads may be decided upon by the control server 20 just prior to delivery.

As such, the content server 12 will identify ad segments to provide with the program segments for the requested program based on the advertising selection criteria derived from the profiles (step 306). The content server 12 will also determine the placement of the identified ad segments relative to the program segments for the requested program (step 308). Once the ad segments have been identified and their placement determined, the content server 12 will generate composite association indicia, which identifies the sequence of the program and ad segments for the requested program (step 310). In essence, the insertion of the ad segments results in modified program content for the requested program. The content server 12 may then effect streaming of the content for the program and ad segments based on the composite association indicia (step 312). In other words, the content for the program and ad segments is streamed in sequence to the customer premise equipment 14 or to other equipment as requested by the subscriber.

As shown in FIG. 4C, the modified program content corresponds to a sequence of intermingled ad segments and program segments for the requested program, based on the logical association of the segments within the composite association indicia. Different versions of the same program with different advertising schemes do not need to be stored on the content server 12. Instead, different composite association indicia are created for different subscriber requests, and when the advertising and program content is delivered to the respective subscribers, the program segments and ad segments for the basic program content and ad content, respectively, are accessed for the various requests.

In certain embodiments, different content servers 12 may store different advertising segments and perhaps different program segments for a given program. If this is the case, the different content servers 12 will coordinate with the customer premise equipment 14 to ensure that the various ad and program segments are streamed at an appropriate time or in an appropriate fashion to the customer premise equipment 14.

Figure 6:
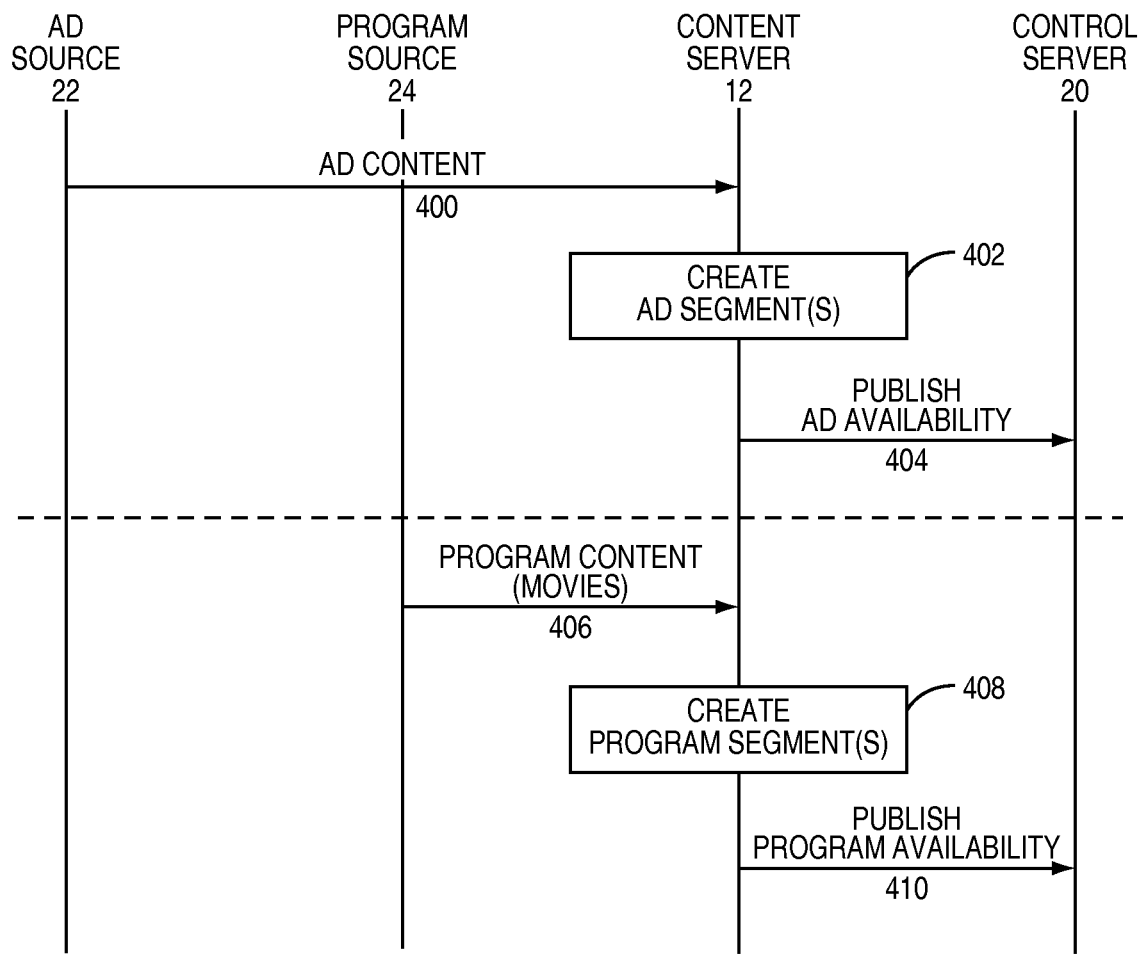
FIG. 6 is a communication flow illustrating ingestion of advertising content and program content according to one embodiment of the present invention.

Turning now to FIG. 6, a communication flow is depicted to illustrate receiving ad content and program content, wherein the program content corresponds to movies or like content that does not include advertising. Initially, the ad source 22 will send ad content to the content server 12 (step 400), which will create ad segments as described above (step 402). As different ad segments are created, the content server 12 will publish the advertising availability associated with the respective advertisements to the control server 20 (step 404). As such, the control server 20 has a record of the ads stored at the content server 12 or at least accessible by the content server 12. Similarly, the program source 24 will provide various program content to the content server 12 (step 406), which will create program segments and the associated program association indicia to associate the program segments corresponding to particular programs through one of various mechanisms such as, but not limited to, the detection of scene transitions, cue-tones, or program meta-data (step 408). The content server 12, once the program segments for a given program are created, will publish the program availability to the control server 20 (step 410), which will keep track of the programs that are stored on or accessible by the content server 12. However, the program availability could be published prior to any of the program segments being created. In the illustrated embodiment, the content server 12 will wait until all of the program segments for a given program are created before alerting the program server 20 that the program is available at the content server 12.

Figure 7:
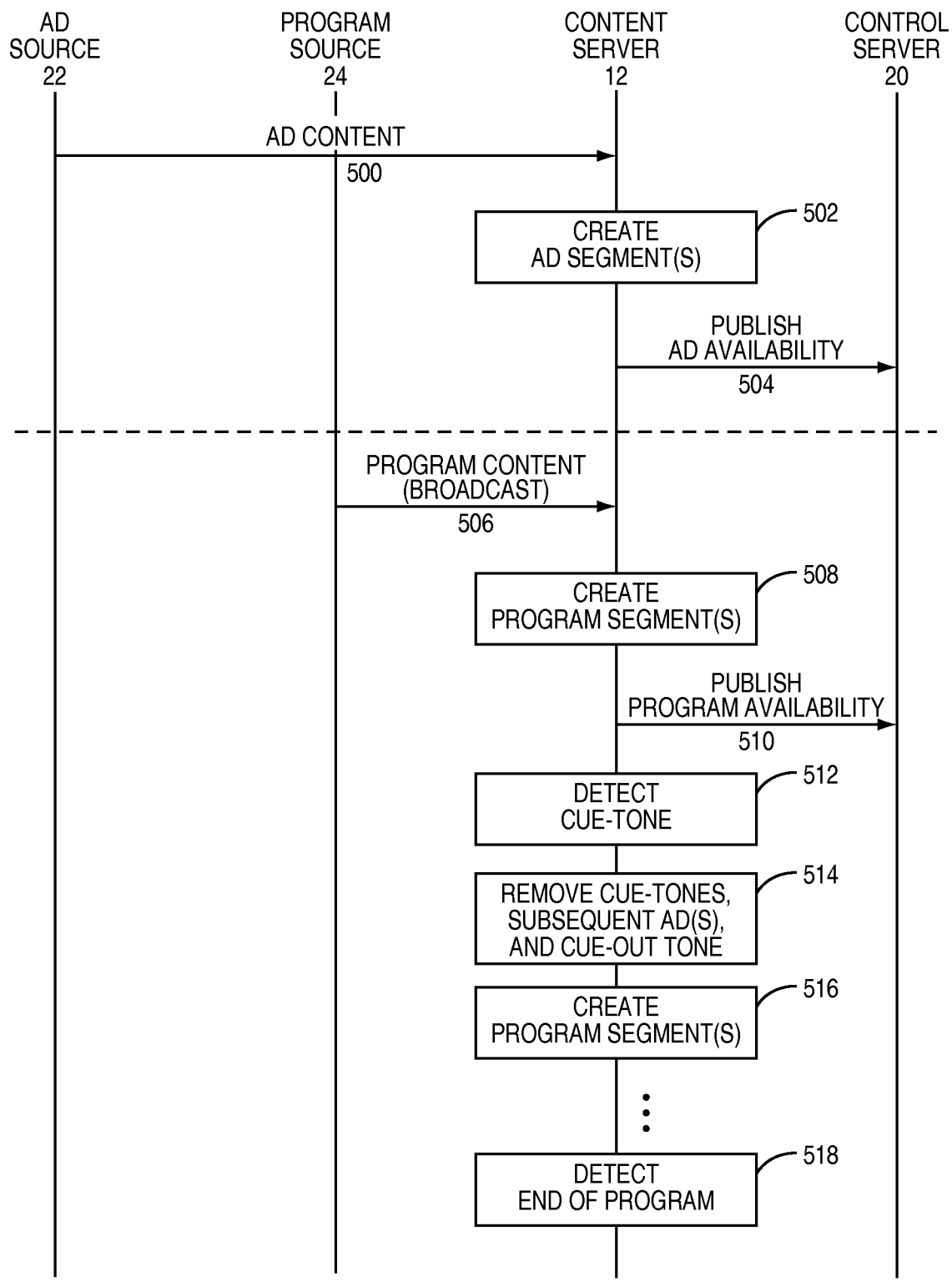
FIG. 7 is a communication flow illustrating ingestion of ad content and program content according to a second embodiment of the present invention.

With reference to FIG. 7, an embodiment is illustrated wherein the program content provided from the program source 24 to the content source 12 includes original advertising. Within the program content, there are signals such as cue-tones that indicate the beginning and end of advertising content within the program content. The content server 12 is configured to detect and remove advertising content from the original program content and create program segments for the program, wherein the program segments do not contain advertising content. As such, the content server 12 is able to provide alternative advertising in a dynamic fashion within the programs that are actually delivered to the customer premise equipment 14.

Initially, assume the ad source 22 delivers ad content to the content server 12 (step 500), which creates the ad segments as described above (step 502). As ad segments are created by the content server 12, their availability is published to the control server 20 (step 504). When the program source 24 delivers program content, such as broadcast television content including advertising, to the content server 12 (step 506), the content server 12 will begin creating program segments for the actual program content (step 508). Since a subscriber may want to view the program content in substantially real time or with limited delay, the content server 12 may publish the availability of the program to the control server 20 before all of the program is received by the content server 12 (step 510). As the program content is received, the content server 12 may detect cue-tones, which indicate the beginning of an advertisement (step 512), and then remove the cue-tone, subsequent advertisement or advertisements, and any cue-out tone indicating the end of the advertisement or advertisements from the program content (step 514). The content server 12 will continue to create program segments that exclude any of the original advertising (step 516), and the process will continue until the end of the program content or the program is detected (step 518).

As illustrated, the content server 12 may continually or periodically update the program availability to the control server 20. As such, the control server 20 will remain informed of the progress and availability of the program accessible by the content server 12, which may include information on the number, length, location, or course of the original ads. Notably, various aspects illustrated in FIGS. 6 and 7 may be applied to program content, regardless of whether original advertising is provided.

Figure 8:
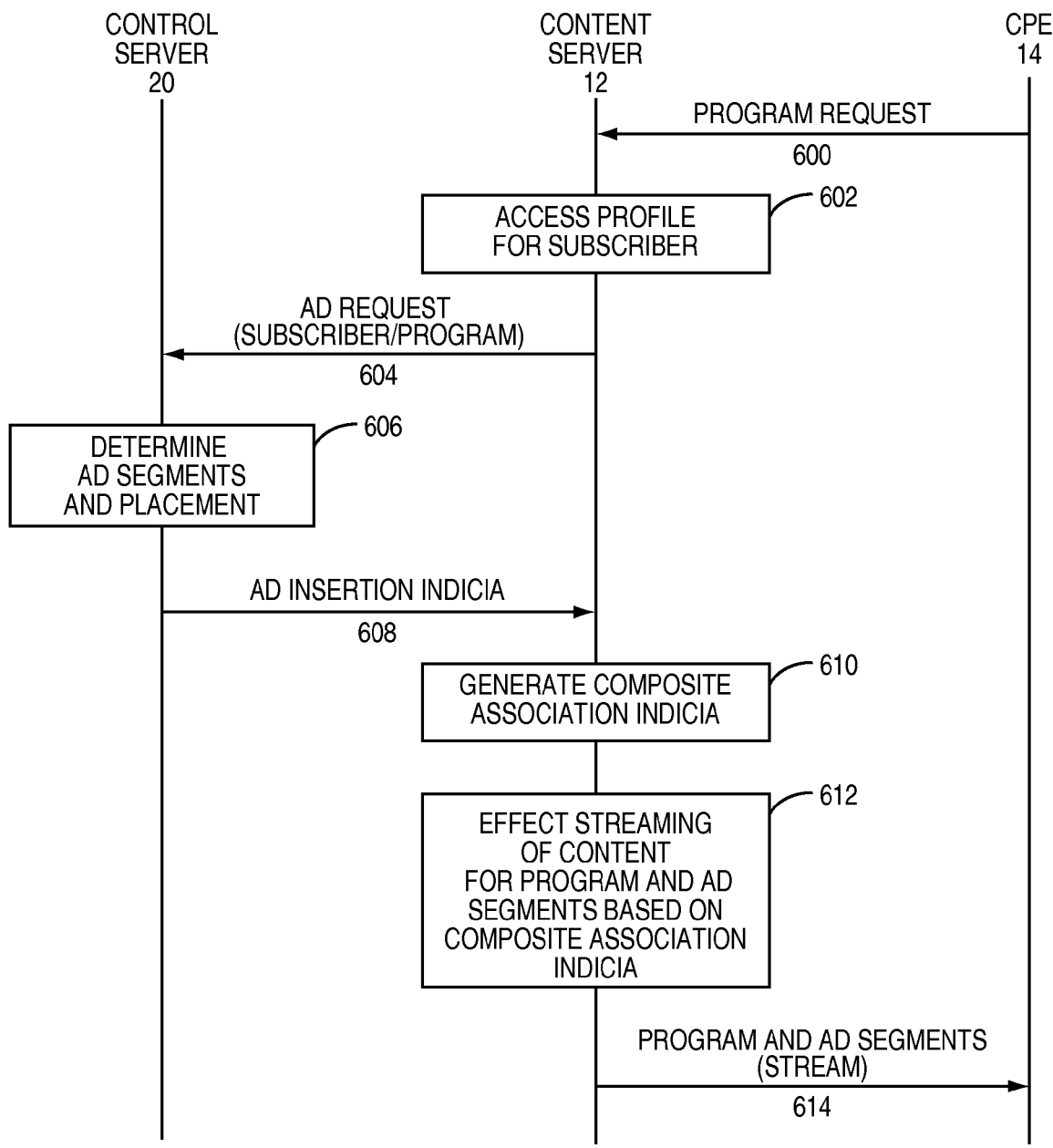
FIG. 8 is a communication flow illustrating the handling of a request from a subscriber according to one embodiment of the present invention.

Turning now to FIG. 8, a communication flow is provided to illustrate the handling of a request for a program by customer premise equipment 14. Initially, a request for a particular program is provided to the content server 12 by a subscriber via the customer premise equipment 14 or other type of equipment (step 600). The content server 12 will access a profile for the subscriber (step 602) to determine how to process the request. In this example, the control server 20 is employed to determine the ad segments to present with the program content and the placement of these ad segments within the program content. As such, the profile for the subscriber may simply instruct the content server 12 to request advertising information for the given subscriber and the program requested by the subscriber (step 604). The control server 20 will access any advertising selection criteria and determine the ad segments to provide with the program content, and the placement of the ad segments within the program content based on the advertising selection criteria (step 606). This selection process may be pre-computed to reduce delay on the program access request, for instance an asynchronous computation may be started as the result of a user purchase request (which occurs prior to the request for the program), or all valid requests may be pre-computed for each user or user group.

The control server 20 will then send to the content server 12 ad insertion indicia, which identify the ad segments and their placement within the program content (step 608). The content server 12 will process the ad insertion indicia to generate the composite association indicia, which identifies the sequence of program segments and ad segments for the modified program content corresponding to the program requested by the subscriber (step 610). The content server 12 will then effect streaming of content for the program and advertising segments based on the sequence defined in the composite association indicia to the customer premise equipment 14 (steps 612 and 614).

Those skilled in the art will recognize that the content server 12 may alone or in association with the control server 20 cooperate to receive a request from a subscriber and use advertising selection criteria based on any number of variables to dynamically generate the composite association indicia defining the sequence of program segments and ad segments to be presented to the subscriber. All such processing may be provided at the content server 12 or the control server 20, as well as being shared in any way between these two entities or other entities. The entity within the core network 16 that provides such functionality is not critical to deployment of the invention. Further, a request for a program need not be responded to in real time. For example, the subscriber may send instructions to the content server 12 in the form of a request to record a program in the future, or make a program available to the subscriber in the future. As such, the content server 12 may identify advertising for the program and generate the composite association indicia for the program when the request is received, when the program is available, when the program is due to be delivered to the subscriber, when delivery of the program is requested by the subscriber, or at any point therebetween. The time at which the processing occurs is not as important as the fact that the processing is available to customize advertising, which is provided in a given program based on any number of criteria.

As a slight modification to the concepts described above, the content server 12 may be able to deliver program and advertising content in different formats to different customer equipment. For example, if the customer equipment is a set-top box, content may be delivered at a much higher resolution than if the customer equipment is a personal digital assistant or other device that requires or benefits from a different content format. The different content formats may correspond to different resolutions, compression techniques, encoding techniques, and the like. In one embodiment, the program segments and ad segments that form the blocks from which various modified program content may be created are stored in a reference format. If the modified program content must be delivered in a format other than the reference format to customer equipment, any processing to change resolutions, compression rates, or encoding types, may be provided in real time as the content is being delivered to the customer equipment. As such, redundant formats need not be stored on the content server 12. However, certain embodiments may benefit from having the different program segments and ad segments stored in the different formats, such that further processing is not necessary when delivering the content to the customer equipment. With regard to encryption, the program segments and ad segments may be stored in an encrypted fashion or in an unencrypted fashion. Encryption or re-encryption of such content may take place at any time desired by the service provider.

Figure 9:
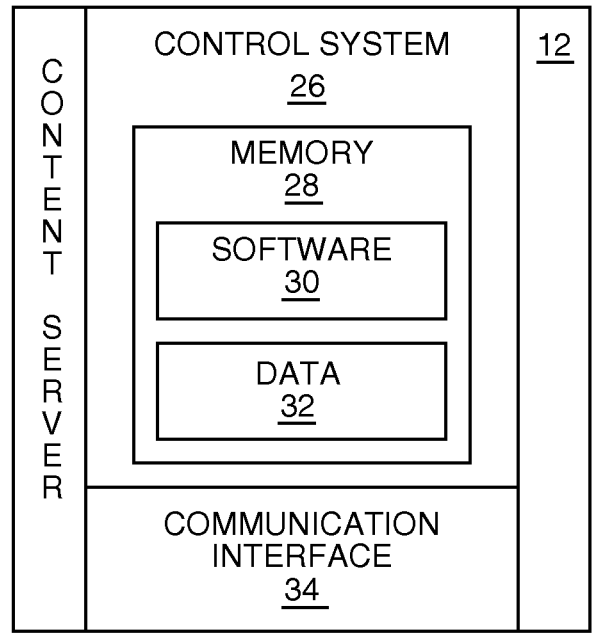
FIG. 9 is a block representation of a content server according to one embodiment of the present invention.

Turning now to FIG. 9, a block representation of a content server 12 is illustrated according to one embodiment of the present invention. The content server 12 will include a control system 26 having sufficient memory 28 for the requisite software 30 and data 32 to operate as described above. The control system 26 may be associated with one or more communication interfaces 34 to facilitate communications over the core network 16, and in particular with the control server 20, ad source 22, program source 24, and various equipment of the subscriber, including the customer premise equipment 14.

Figure 10:
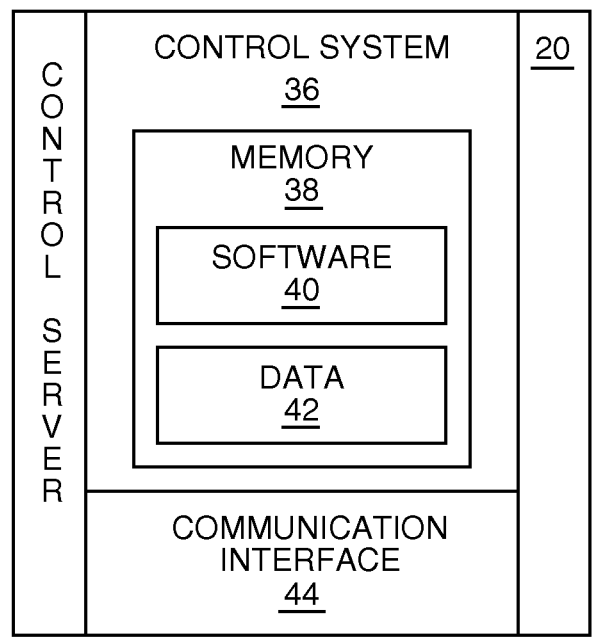
FIG. 10 is a block representation of a control server according to one embodiment of the present invention.

Turning now to FIG. 10, a block representation of a control server 20 is illustrated according to one embodiment of the present invention. The control server 20 will include a control system 36 having sufficient memory 38 for the requisite software 40 and data 42 to operate as described above. The control system 36 may be associated with one or more communication interfaces 44 to facilitate communications over the core network 16, and in particular with the content server 12, ad source 22, program source 24, and various equipment of the subscriber, including the customer premise equipment 14.

Those skilled in the art will recognize improvements and modifications to the preferred embodiments of the present invention. All such improvements and modifications are considered within the scope of the concepts disclosed herein and the claims that follow.

What is claimed is:

1. A method for delivering content over a core network to user equipment comprising:
    delivering an advertisement to a content server;
    creating first advertising segments in response to the delivered advertisement;
    publishing an availability of the first advertising segments to a control server;
    delivering a first program content to the content server, the first program content including associated original advertisement segments;
    publishing an availability of the first program content to the control server;
    detecting cue tones in the first program content;
    creating first program segments in response to the detected cue tones by removing the detected cue tones and the associated original advertisement segments;
    receiving a first request for first program content from a first user;
    creating composite association indicia identifying a first sequence of the first program segments and the first advertising segments in response to the first request for the first program content, the first program segments corresponding to segments of the first program content and the first advertising segments corresponding to a quantity of first advertisements to provide during presentation of the first program content, the quantity of first advertisements based on a rate paid by the first user;

storing the composite association indicia on the content server; and effecting delivery, by the control server, of the first program segments and the first advertising segments according to the first sequence based on the stored composite association indicia, wherein the first program content is delivered to equipment of the first user and includes the quantity of first advertisements.

2. The method of claim 1 further comprising:
receiving the first program content;
creating the first program segments from the first program content; and storing the first program segments.

3. The method of claim 2 further comprising associating all of the first program segments with program association indicia.

4. The method of claim 2 further comprising publishing an availability of the first program content to a control entity prior to the creation of any of the first program segments.

5. The method of claim 2 further comprising publishing an availability of the first program content to a control entity prior to all of the first program segments being created.

6. The method of claim 1, wherein effecting delivery includes:
accessing the first program segments and the first advertising segments according to the first sequence identified in the composite association indicia.

7. The method of claim 1 wherein the first program content is received with original advertisements, the method further comprising removing the original advertisements from the first program content such that the first program segments do not include advertisements.

8. The method of claim 1 further comprising:
receiving the quantity of first advertisements;
creating the first advertising segments for the quantity of first advertisements; and
storing the first advertising segments.

9. The method of claim 1 wherein program segments including the first program segments for program content of a plurality of programs are maintained along with advertising segments including the first advertising segments, the method further comprising:
accessing advertising selection criteria in response to the first request for the first program content; and
identifying the first advertising segments corresponding to the quantity of first advertisements to provide with the first program content when delivered to the equipment of the first user based on the advertising selection criteria.

10. The method of claim 9 further comprising determining where to place the quantity of first advertisements among the first program segments before creating the composite association indicia.

11. The method of claim 9 wherein the advertising selection criteria comprises at least one of a group consisting of a type of the user equipment; a provider of the user equipment; or a service provider.

12. The method of claim 1 wherein the first program content comprises at least one of a group consisting of audio content or video content.

13. The method of claim 1 further comprising changing a format of the first program segments from one format to another prior to effecting delivery of the first program segments and the first advertising segments, wherein the format is as at least one of a compression rate, an encoding technique, and a resolution.

14. The method of claim 1 further comprising:
receiving a second request for the first program content from a second user;
creating composite association indicia identifying a second sequence of first program segments and second advertising segments in response to the second request for the first program content, the first program segments corresponding to segments of the first program content and the second advertising segments corresponding to a quantity of second advertisements to provide during presentation of the first program content; and
effecting delivery of the first program segments and the second advertising segments according to the second sequence, wherein the first program content is delivered to equipment of the second user and includes the quantity of second advertisements.

15. The method of claim 14 wherein at least one of the second advertising segments is different from the first advertising segments, such that at least certain advertising delivered in the first program content to the equipment of the first user is different than at least certain advertising delivered in the first program content to the equipment of the second user.

16. The method of claim 15 wherein at least one of the second advertising segments is the same as the first advertising segments, such that some advertising delivered in the first program content to the equipment of the first user is the same as some advertising delivered in the first program content to the equipment of the second user.

17. The method of claim 1 wherein each step is provided in the core network and outside of premises of the first user the composite association indicia is a plurality of program segment identifiers and a plurality of advertisement segment identifiers ordered in the first sequence.

18. A system configured to deliver content over a core network to user equipment comprising:
at least one communication interface; and
a control system associated with the at least one communication interface and configured to:
deliver an advertisement to a content server;
create first advertising segments in response to the delivered advertisement;
publish an availability of the first advertising segments to a control server;
deliver a first program content to the content server, the program including associated original advertisement segments;
publish an availability of the first program content to the control server;
detect cue tones in the first program content;
create first program segments in response to the detected cue tones by removing the detected cue tones and the associated original advertisement segments;
receive a first request for first program content from a first user;
create composite association indicia identifying a first sequence of first program segments and first advertising segments in response to the first request for the first program content, the first program segments corresponding to segments of the first program content and the first advertising segments corresponding to a quantity of first advertisements to provide during presentation of the first program content, the quantity of first advertisements based on a rate paid by the first user;
store the composite association indicia; and
effect delivery of the first program segments and the first advertising segments according to the first sequence based on the stored composite association indicia, wherein the first program content is delivered to equipment of the first user and includes the quantity of first advertisements.

19. The system of claim 18 wherein the control system is further configured to:
   receive the first program content;
   create the first program segments from the first program content; and
   store the first program segments.

20. The system of claim 19 wherein the control system is further configured to associate all of the first program segments with program association indicia.

21. The system of claim 18 wherein the first program content is received with original advertisements, and the control system is further configured to remove the original advertisements from the first program content such that the first program segments do not include advertisements.

22. The system of claim 18 wherein the control system is further configured to:
   receive the quantity of first advertisements;
   create the first advertising segments for the quantity of first advertisements; and
   store the first advertising segments.

23. The system of claim 18 wherein program segments including the first program segments for program content of a plurality of programs are maintained along with first advertising including the first advertising segments, wherein the control system is further configured to:
   access advertising selection criteria in response to the first request for the first program content; and
   identify the first advertising segments corresponding to the quantity of first advertisements to provide with the first program content when delivered to the equipment of the first user based on the advertising selection criteria.

24. The system of claim 23 wherein the control system is further configured to determine where to place the quantity of first advertisements among the first program segments to identify the first sequence.

25. A network for delivering content over a core network to user equipment comprising:
   means for delivering an advertisement to a content server;
   means for creating first advertising segments in response to the delivered advertisement;
   means for publishing an availability of the first advertising segments to a control server;
   means for delivering a first program content to the content server, the first program content including associated original advertisement segments;
   means for publishing an availability of the first program content to the control server;
   means for detecting cue tones in the program;
   means for creating first program segments in response to the detected cue tones by removing the detected cue tones and the associated original advertisement segments;
   means for receiving a first request for first program content from a first user;
   means for creating composite association indicia identifying a first sequence of first program segments and first advertising segments in response to the first request for the first program content, the first program segments corresponding to segments of the first program content and the first advertising segments corresponding to a quantity of first advertisements to provide during presentation of the first program content, the quantity of first advertisements based on a rate paid by the first user;
   means for storing the composite association indicia on content server; and
   means for effecting delivery of the first program segments and the first advertising segments according to the first sequence based on the stored composite association indicia, wherein the first program content is delivered to equipment of the first user and includes the quantity of first advertisements.

* * * * *